(12) United States Patent
Hassan et al.

(10) Patent No.: US 10,524,086 B2
(45) Date of Patent: *Dec. 31, 2019

(54) USE CONDITION FOR A GEOGRAPHIC PHONE NUMBER

(71) Applicant: Microsoft Technology Licensing, LLC, Redmond, WA (US)

(72) Inventors: Amer Aref Hassan, Kirkland, WA (US); David Michael Halley, Seattle, WA (US); David Anthony Lickorish, Sammamish, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,941

(22) Filed: Jun. 23, 2017

(65) Prior Publication Data
US 2018/0376279 A1  Dec. 27, 2018

(51) Int. Cl.
| H04L 29/06 | (2006.01) |
| H04W 4/021 | (2018.01) |
| H04M 3/42 | (2006.01) |
| H04M 3/436 | (2006.01) |
| H04W 4/38 | (2018.01) |
| H04M 3/38 | (2006.01) |

(52) U.S. Cl.
CPC .............. *H04W 4/021* (2013.01); *H04M 3/38* (2013.01); *H04M 3/42357* (2013.01); *H04M 3/436* (2013.01); *H04W 4/38* (2018.02); *H04M 2207/18* (2013.01); *H04M 2242/14* (2013.01)

(58) Field of Classification Search
CPC ............. H04M 3/436; H04M 3/42357; H04M 2207/18; H04M 2242/14; H04M 3/38; H04W 4/021; H04W 4/006; H04W 4/38
USPC ........................................................ 455/414.3
See application file for complete search history.

(56) References Cited

U.S. PATENT DOCUMENTS

| 3,985,972 A | * | 10/1976 | Rolin ..................... H04M 1/677 379/197 |
| 4,661,974 A | * | 4/1987 | Bales ...................... H04M 3/38 379/198 |

(Continued)

FOREIGN PATENT DOCUMENTS

| EP | 0799555 A1 | 10/1997 |
| EP | 1435749 | 7/2004 |

(Continued)

OTHER PUBLICATIONS

Upadhyay, et al., "A Comprehensive study on tracking VoIP Caller", in IOSR Journal of Computer Engineering, vol. 9, Issue 1, Jan. 2013, pp. 61-65.

(Continued)

*Primary Examiner* — Charles T Shedrick
(74) *Attorney, Agent, or Firm* — Schwegman Lundberg & Woessner, P.A.

(57) ABSTRACT

Techniques for use condition for a geographic phone number are described. According to various implementations, techniques described herein enable a policy pertaining to the use of a geographic phone number to be enforced, such as to prevent unpermitted use of the geographic phone number.

20 Claims, 10 Drawing Sheets

(56) References Cited

U.S. PATENT DOCUMENTS

| | | | |
|---|---|---|---|
| 5,552,795 A | 9/1996 | Tayloe et al. | |
| 5,839,063 A * | 11/1998 | Lee | H04W 12/12 |
| | | | 455/410 |
| 7,194,273 B2 * | 3/2007 | Vaudreuil | H04W 48/04 |
| | | | 455/419 |
| 7,444,148 B1 | 10/2008 | Cook | |
| 7,899,167 B1 | 3/2011 | Rae | |
| 8,036,160 B1 | 10/2011 | Oakes | |
| 8,249,055 B2 | 8/2012 | Beinroth et al. | |
| 8,315,635 B2 | 11/2012 | Nicholson et al. | |
| 8,358,645 B2 | 1/2013 | Xu | |
| 8,406,813 B2 | 3/2013 | Kirbas et al. | |
| 8,437,790 B1 * | 5/2013 | Hassan | H04W 72/044 |
| | | | 370/329 |
| 8,478,277 B2 | 7/2013 | Jiang | |
| 8,498,222 B2 | 7/2013 | Brooks et al. | |
| 8,554,168 B1 | 10/2013 | Bonner et al. | |
| 8,594,298 B2 | 11/2013 | Klein et al. | |
| 8,600,391 B2 | 12/2013 | Vendrow et al. | |
| 8,849,267 B2 | 9/2014 | Garg | |
| 9,060,075 B2 | 6/2015 | Goodman et al. | |
| 9,185,526 B2 | 11/2015 | Guba et al. | |
| 9,311,496 B1 * | 4/2016 | Dutch | G06F 21/604 |
| 9,319,519 B2 | 4/2016 | Lee et al. | |
| 9,426,302 B2 | 8/2016 | Layman et al. | |
| 9,443,010 B1 | 9/2016 | Glooip et al. | |
| 9,706,351 B1 | 7/2017 | Brewer | |
| 10,165,495 B1 | 12/2018 | Hassan et al. | |
| 2004/0229620 A1 | 11/2004 | Zhao et al. | |
| 2005/0020263 A1 | 1/2005 | Sherman et al. | |
| 2005/0101327 A1 | 5/2005 | Nam et al. | |
| 2005/0215243 A1 | 9/2005 | Black et al. | |
| 2005/0259802 A1 | 11/2005 | Gray et al. | |
| 2006/0020459 A1 | 1/2006 | Carter et al. | |
| 2006/0039539 A1 | 2/2006 | Goldman et al. | |
| 2006/0089140 A1 | 4/2006 | Zhang | |
| 2006/0205404 A1 | 9/2006 | Gonen et al. | |
| 2007/0060097 A1 | 3/2007 | Edge | |
| 2008/0101552 A1 | 5/2008 | Khan et al. | |
| 2008/0125077 A1 | 5/2008 | Velazquez et al. | |
| 2008/0304487 A1 | 12/2008 | Kotecha | |
| 2009/0003314 A1 | 1/2009 | Hubner | |
| 2009/0011759 A1 | 1/2009 | Alperovich et al. | |
| 2009/0196284 A1 | 8/2009 | Beinroth | |
| 2009/0279534 A1 | 11/2009 | Reiher | |
| 2010/0056100 A1 | 3/2010 | Elman et al. | |
| 2010/0080216 A1 | 4/2010 | Croy | |
| 2010/0153733 A1 | 6/2010 | Heffez | |
| 2012/0282924 A1 | 11/2012 | Tagg et al. | |
| 2013/0121214 A1 | 5/2013 | Ma et al. | |
| 2013/0203408 A1 | 8/2013 | Dowds et al. | |
| 2013/0294443 A1 | 11/2013 | Kahn | |
| 2013/0331096 A1 | 12/2013 | Rogan | |
| 2014/0036658 A1 | 2/2014 | Bonner et al. | |
| 2014/0074596 A1 | 3/2014 | Kolluri et al. | |
| 2014/0273982 A1 * | 9/2014 | Faliero | H04M 3/42255 |
| | | | 455/414.1 |
| 2014/0337094 A1 | 11/2014 | Jain | |
| 2014/0376414 A1 | 12/2014 | Edge | |
| 2015/0080016 A1 | 3/2015 | Smith et al. | |
| 2015/0201086 A1 | 7/2015 | Abi et al. | |
| 2015/0237469 A1 | 8/2015 | Stephens et al. | |
| 2015/0271855 A1 | 9/2015 | Livingood | |
| 2016/0007159 A1 * | 1/2016 | Dupray | G06Q 30/02 |
| | | | 455/456.1 |
| 2016/0094725 A1 | 3/2016 | Dabbiere et al. | |
| 2016/0112466 A1 | 4/2016 | Gunnalan et al. | |
| 2016/0241719 A1 | 8/2016 | Kahn | |
| 2016/0337513 A1 | 11/2016 | Seward et al. | |
| 2017/0034357 A1 | 2/2017 | Salomon et al. | |
| 2017/0188395 A1 | 6/2017 | Kim et al. | |
| 2018/0124561 A1 | 5/2018 | Hassan et al. | |
| 2019/0007807 A1 | 1/2019 | Hassan et al. | |
| 2019/0028865 A1 | 1/2019 | Raleigh et al. | |

FOREIGN PATENT DOCUMENTS

| | | |
|---|---|---|
| EP | 1991019 A1 | 11/2008 |
| EP | 2099242 A2 | 9/2009 |
| WO | 2006002048 A2 | 1/2006 |
| WO | 2007121331 A2 | 10/2007 |

OTHER PUBLICATIONS

"Prepay Geographic Local UK VoIP Numbers", https://www.open-telecom.co.uk/cms/products-services/prepay-geographic-local-uk-voip-numbers/, Retrieved on: May 18, 2017, 2 pages.

"Cisco Unified Communications Manager Express System Administrator Guide", Retrieved at: http://www.cisco.com/c/en/us/td/docs/voice_ip_comm/cucme/admin/configuration/manual/cmeadm/cmelpcor.html—on Jun. 28, 2017, 58 pages.

"6 Best & Free Call Forwarding Android Apps", Available at: http://allusefulinfo.com/best-free-call-forwarding-android-apps/, Mar. 17, 2015, 10 pages.

"Non-Final Office Action", U.S. Appl. No. 15/337,381, dated Oct. 18, 2017, 31 pages.

"Non-Final Office Action", U.S. Appl. No. 15/639,413, dated Mar. 7, 2018, 8 pages.

"Non-Final Office Action", U.S. Appl. No. 15/630,247, dated Jan. 24, 2018, 14 pages.

"Assessment of VoIP location capabilities to support emergency services", https://www.ofcom.org.uk/_data/assets/pdf_file/0018/49302/emergency-voip-location.pdf, Jun. 28, 2011, 59 pages.

"Restriction Requirement", U.S. Appl. No. 15/630,247, dated Sep. 28, 2017, 8 pages.

"Non Final Office Action Issued in U.S. Appl. No. 15/669,553", dated May 9, 2018, 19 Pages.

"Final Office Action Issued in U.S. Appl. No. 15/337,381", dated Jun. 14, 2018, 43 Pages.

"International Search Report and Written Opinion Issued in PCT Application No. PCT/US2018/034510", dated Aug. 16, 2018, 10 Pages.

"International Search Report and Written Opinion Issued in PCT Application No. PCT/US2018/035518", dated Sep. 12, 2018, 12 Pages.

"International Search Report and Written Opinion Issued in PCT Application No. PCT/US2018/034003", dated Feb. 4, 2019, 17 Pages.

"Non Final Office Action Issued in U.S. Appl. No. 16/181,243", dated Feb. 21, 2019, 11 Pages.

* cited by examiner

_US 10,524,086 B2_

USE CONDITION FOR A GEOGRAPHIC PHONE NUMBER

BACKGROUND

Today's mobile devices provide users with a tremendous amount of portable functionality. For instance, smartphones, tablets, laptops, and so on, enable users to perform a variety of different tasks without being tied to a particular location. The ability to engage in various types of communication in a mobile scenario is particularly useful. A mobile device, for example, typically includes functionality for engaging in different types of communication with other devices and/or services, such as voice calls, video calls, messaging, and so forth. Thus, a user may leverage a mobile device to communicate with other users via a variety of different communication modalities.

While mobile devices enable communication in diverse scenarios, there are challenges to consistently enabling a user to communicate via a particular device when the user moves between geographic locations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for use condition for a geographic phone number are described. According to various implementations, techniques described herein enable a policy pertaining to the use of a geographic phone number to be enforced, such as to prevent unpermitted use of the geographic phone number.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Techniques for use condition for a geographic phone number are described. Generally, a phone number refers to a set of characters that can be used to initiate communication with a particular resource. According to various implementations, techniques described herein enable various policies pertaining to the use of telephone numbers at different locations to be enforced. For instance, a particular regulatory policy and/or enterprise policy may specify that particular geographically-specific phone numbers (e.g., numbers with a particular area code) are not permitted to be used outside of a defined geographical area. Thus, techniques for use condition for a geographic phone number enable call policies for geographic phone numbers to be enforced, such as to prevent unpermitted use of geographic phone numbers.

The use of the term "telephone number" herein is not to be construed as limiting, and it is to be appreciated that "telephone number" may refer to any string of characters, numeric and/or textual, that may be utilized to engage in the exchange of communication media across a network and between different devices. In at least some implementations, a telephone number represents a number that can be used to route a call between an Internet Protocol (IP) network, and a Public Switched Telephone Network ("PSTN").

In the following discussion, an example environment is first described that is operable to employ techniques described herein. Next, some example scenarios are described for use condition for a geographic phone number in accordance with one or more implementations. Following this, some example procedures are described in accordance with one or more implementations. Finally, an example system and device are described that are operable to employ techniques discussed herein in accordance with one or more implementations.

Having presented an overview of example implementations in accordance with one or more implementations, consider now an example environment in which example implementations may by employed.

Figure 1:
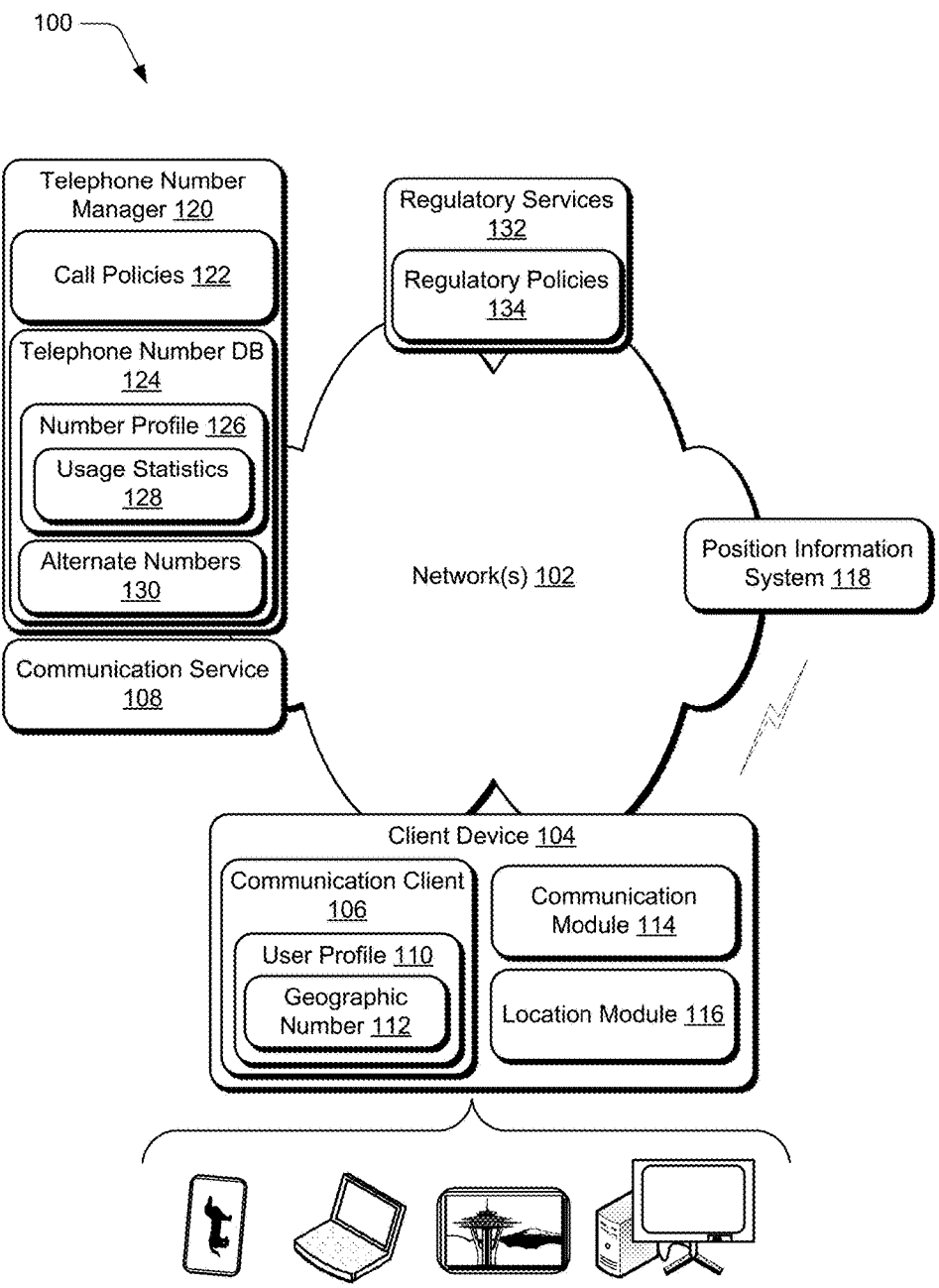
FIG. 1 is an illustration of an environment in an example implementation that is operable to employ techniques discussed herein.

FIG. 1 is an illustration of an environment 100 in an example implementation that is operable to employ techniques for location based number management described herein. The environment 100 includes a communication network 102, which is representative of different connected components that exchange, process, and/or route data to enable different forms of communication. Examples of the network 102 include a local access network (LAN), wide area network (WAN), the Internet, a wireless cellular communication network, a Public Switched Telephone Network (PSTN), an Internet of Things (IoT) network, and combinations thereof. The network 102, for instance, represents a combination of interconnected wireless and wired networks that enable communication at various geographic locations and via a variety of different communication modalities.

Connected to the network 102 is a client device 104, which is representative of an end-user device configured to communicate via the network 102. The client device 104 may be configured in a variety of ways, such as a wireless cellular phone (e.g., a smartphone), a tablet, a laptop, and so forth. One example implementation of the client device 104 is presented below as the computing device 1002 of FIG. 10.

The client device 104 includes a communication client 106, which is representative of functionality to enable different forms of communication via the client device 104. Examples of the communication client 106 include a voice communication application (e.g., a Voice over Internet Protocol (VoIP) client), a video communication application, a messaging application, a content sharing application, and combinations thereof. The communication client 106, for instance, enables different communication modalities to be combined to provide diverse communication scenarios. In at least some implementations, the communication client 106 represents an application that is installed on the client device 104. Additionally or alternatively, the communication client 106 can be implemented all or in part as a remote application, such as accessed via a web browser, a web application, and so forth.

According to various implementations, the communication client 106 is configured to enable various types of communication via interaction with a communication service 108. The communication service 108 is representative of a service to perform various tasks for management of communication between the client device 104 and other entities, e.g., other client devices. The communication service 108, for instance, can manage initiation, moderation, and termination of communication sessions for the client device 104. Examples of the communication service 108 include a VoIP service, an online conferencing service, a unified communications and collaboration (UC&C) service, and so forth. In at least some implementations, the communication service 108 may be implemented as and/or be connected to a private branch exchange (PBX) in communication with a Public Switched Telephone Network ("PSTN") to enable voice communication between the client device 104 and other devices and/or services.

The communication client 106 is associated with a user profile 110, which represents a way of authenticating a particular user with the communication client 106 and the communication service 108, and for tracking user-specific authentication information (e.g., username, password, and so forth), user settings, contacts, and other data for the user. In at least some implementations, the user profile 110 is portable such that the user can authenticate with a different instance of the communication client 106, and make calls via the different instance of the communication client 106 that are identified as being connected with the user profile 110. The user profile 110 includes a geographic phone number ("geographic number") 112, which generally represents a telephone number that is associated with a particular geographic usage constraint. The geographic number 112, for instance, is only permitted to be used in a particular geographic region.

The client device 104 further includes a communication module 114 and a location module 116. The communication module 114 is representative of functionality for enabling the client device 104 to communicate data via wired and/or wireless connectivity to the service network 102. The location module 116 is representative of functionality receiving, transmitting, and/or processing location information. The location module 116, for instance, supports transmission, reception, and processing of position information according to a variety of different technologies, such as Global Positioning System (GPS), cellular communication, WiFi™, satellite communication, radio frequency (RF) communication, subnet information, Ethernet switch and/or port data, Internet Protocol (IP) address information, and so forth.

According to various implementations, the location module 116 can communicate with a position information system 118 to obtain position information for the client device 104. The position information system 118 is representative of various types of position information systems that can transmit and/or receive position information. Examples of the position information system 118 include GPS satellites, cellular telephone networks, wireless data (e.g., WiFi™) networks, location information services (LIS), radio frequency identifier (RFID) functionality, subnets of wired networks, Ethernet switches and/or ports, and so forth.

According to various implementations, position information can be communicated between the location module 116 and the position information system 118 to enable a location of the client device 104 to be determined. Examples of position information include GPS coordinates, street addresses, network location, location with reference to cell towers and/or cellular base stations, and so forth.

The environment 100 further includes a telephone number manager ("number manager") 120, which is representative of functionality for performing various aspects of techniques for use condition for a geographic phone number discussed herein. For instance, the number manager 120 can track usage statistics for different phone numbers. With reference to the client device 104, for instance, the number manager 120 can track temporal and geographic usage statistics for the geographic number 112.

Generally, the number manager 120 represents a remote service that is remote from the client device 104 and that can provide services pertaining to use condition for a geographic phone number. The number manager 120 includes call policies 122 and a telephone number database ("number DB") 124. The call policies 122 represent different policies that can be applied to determine permitted and disallowed calling behaviors, such as locations where the geographic number is permitted and/or not permitted to be used for placing and/or receiving calls.

The number DB 124 represents a database that stores different usage statistics for telephone numbers. The number DB 124 includes a number profile 126 for the client device 104. The number profile 126 generally includes different information pertaining to the client device 104, such as a user identifier (ID) associated with the user profile 110, a service level for the user profile 110, authentication information for the user profile 110, and so forth. In this particular example, the number profile 126 includes usage statistics 128, which represent data describing different geographic locations at which the geographic number 112 is utilized for making calls, and times at which the geographic number 112 is used at the different geographic locations. As used herein, "making a call" can refer to dialing out from the client device 104 using the geographic number 112 and/or receiving a call at the client device 104 dialed from a different device to the geographic number 112.

According to various implementations, the usage statistics 128 can be compared to the call policies 122 to determine whether the geographic number 112 is being used at non-permitted geographic locations and/or in other non-permitted ways. As further described below, various preventative and/or remedial procedures can be performed in response to determining that the geographic number 112 has been used and/or is being used in violation of the call policies 122.

The number manager 120 maintains a set of alternate phone numbers ("alternate numbers") 130, which represent different phone numbers which can be used in place of a geographic phone number for making a call. In at least one implementation, the alternate numbers 130 are not associated with a geographic use constraint, and thus may be used across a variety of different geographic locations for making a call. As discussed below, if the geographical number 112 becomes unavailable (e.g., blocked) due to violation of a call policy 112, an alternate number 130 may be utilized instead for enabling the client device 104 to make a call.

In at least some implementations, the telephone number manager 120 can be implemented and/or managed by a resource such as by the communication service 108, a telephone service and/or system, a cellular network, a data network (e.g., wired and/or wireless), and so forth. Alternatively or additionally, the telephone number manager 120 can be implemented as a standalone service for generating, managing, and/or communicating telephone number policies, telephone numbers, and so forth.

According to one or more implementations, instances of the call policies 122 can be configured based on information provided by and/or interaction with regulatory services 132. The regulatory services 132, for instance, represent government agencies that generate and apply regulatory policies 134. In at least some implementations, the regulatory services 132 include government agencies that regulate various aspects of communication in different geographical locations. Example functions of the regulatory services 132 include management of telephone numbering plans (including allocation and management of area codes, dialing codes, and so forth), management of wired and/or wireless communication resources, allocation of wireless bandwidth, and so on. As used herein, the term "area code" generally refers to a fixed-length or variable-length set of digits that are used to route calls to communications systems in specific geographic and/or political locations. Examples of an area code include a fixed-length 3 digit code such as used in the United States, Canada, a variable length code such as used in Germany and Japan, and so forth. Generally, an area code is not specific to a particular subscriber, but is used to route a call to a general region and may be associated with various geographical use restrictions, such as based on the regulatory policies 134.

The regulatory policies 134 are representative of policies that allocate communication resources for different purposes, and that specify various allowed and disallowed communication-related behaviors. In at least some implementations, the regulatory policies 134 define different geographic regions for different telephone numbers, such as area codes that are to be used for specific geographic locations. Further, the regulatory policies 134 may specify that telephone numbers with certain area codes may not be used outside of respective defined locations, such as defined by political boundaries, geographic coordinates, and so forth.

As mentioned above, instances of the call policies 122 can be configured based on interaction with the regulatory services 132. For instance, a particular regulatory policy 134 may specify that a certain area code is not permitted to be used outside of a geographical region defined for the area code. Thus, the number manager 120 can configure a particular call policy 122 to reflect that a telephone number with the area code is not to be used outside of the geographical region. The particular regulatory policy 134, for example, may specify that the geographic number 112 may not be utilized for making a call outside of a designated geographic region, such as defined by discrete geographic boundaries.

Thus, as further described below, different phone numbers identified in the number profile 126 can be selected from completing calls for the client device 104 and based on the call policies 122.

Having described an example environment in which the techniques described herein may operate, consider now some example implementation scenarios for use condition for a geographic phone number in accordance with one or more implementations.

Figure 2:
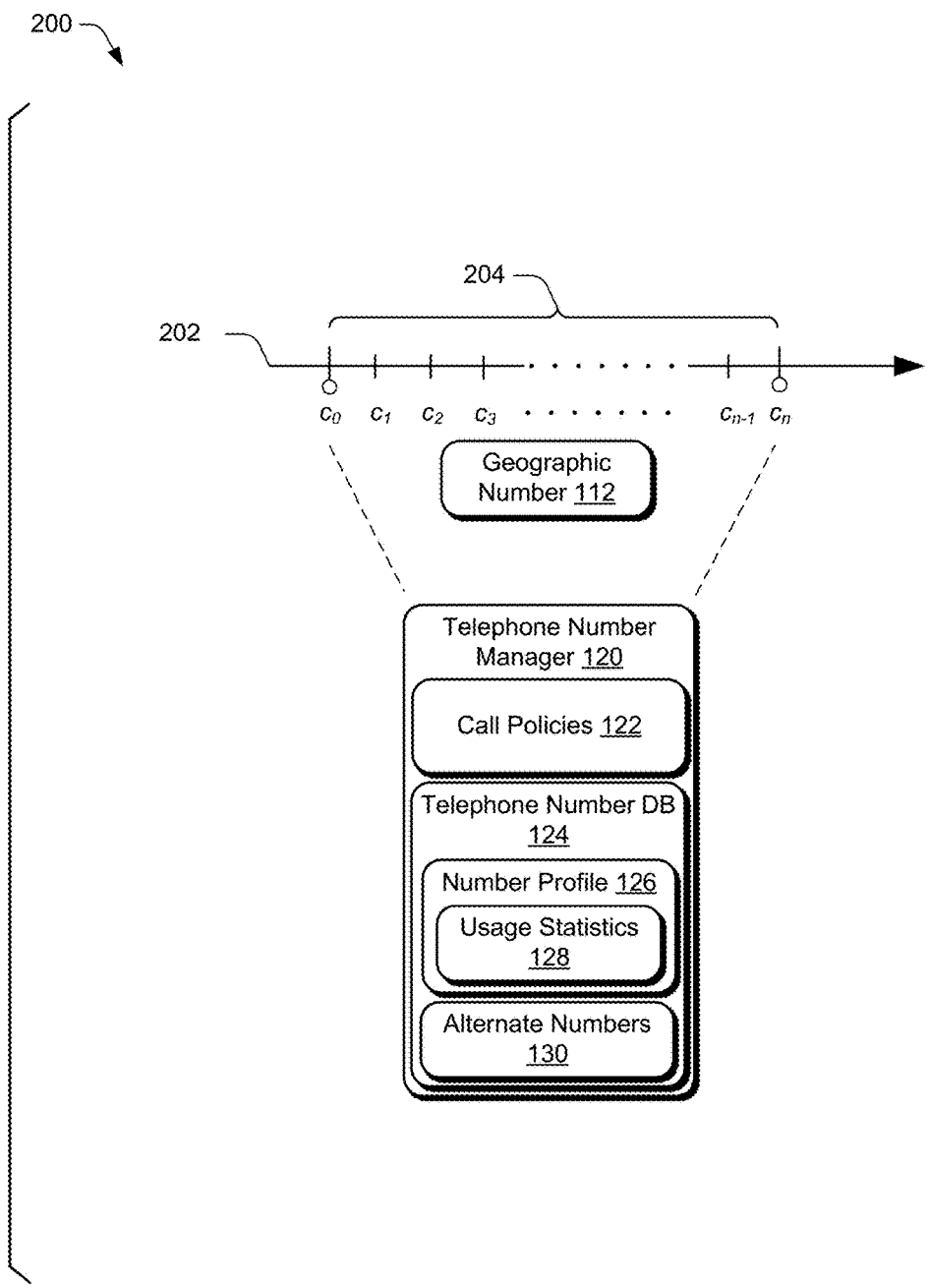
FIG. 2 depicts an example implementation scenario for tracking usage of a geographic number in accordance with one or more implementations.

FIG. 2 depicts an example implementation scenario 200 for tracking usage of a geographic number in accordance with one or more implementations. The scenario 200 includes a number usage timeline 202, which represents a period of time over which the geographic number 112 is utilized for making calls. The usage timeline 202 includes call set 204 including calls (co, co) which are placed using the geographic number 112. According to various implementations, the number manager 120 tracks various information about the call set 204, such as location, date, and time at which the individual calls were placed, duration of the calls, and media types involved in the calls, e.g., whether the calls included voice, video, and/or content sharing. The number manager 120 then saves the information as part of the usage statistics 128. As detailed below, the usage statistics 128 can be analyzed to determine if any corrective and/or preventative actions are to be performed, such as to mitigate impermissible and/or undesirable calling behavior using the geographic number 112.

Figure 3:
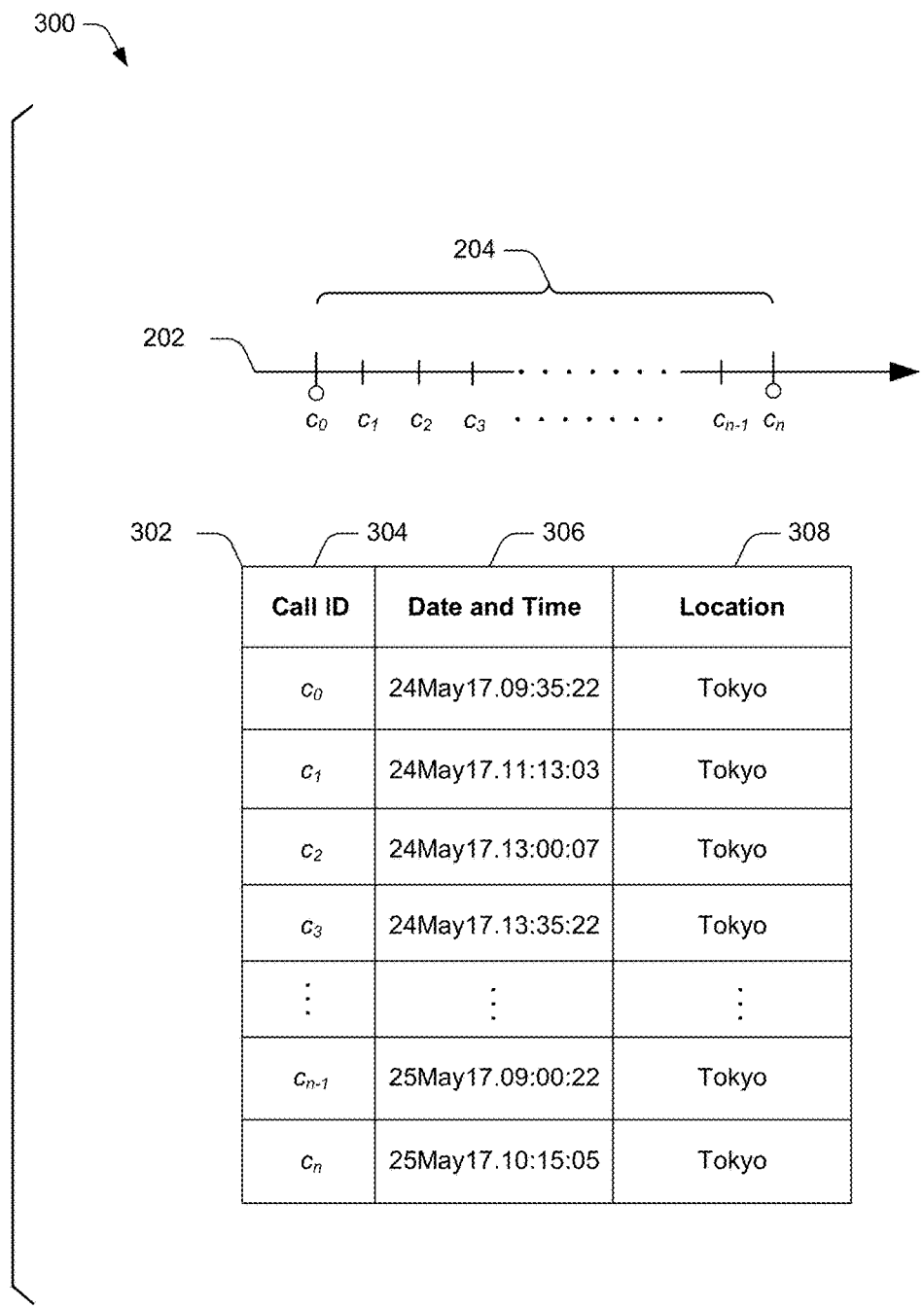
FIG. 3 depicts an example implementation scenario for tracking usage of a geographic number in accordance with one or more implementations.

FIG. 3 depicts an example implementation scenario 300 for tracking usage of a geographic number in accordance with one or more implementations. The scenario 300, for instance, represents one implementation of the call set 204 introduced above and includes call data 302 from the usage statistics 128 and that describes various attributes of individual calls of the call set 204. The call data 302, for instance, includes a call identifier (ID) field 304, a date and time field 306, and a location field 308.

The call ID field 304 includes identifiers for individual calls. For instance, each time a call is connected, an identifier is generated for the call that enables the call to be differentiated from other calls and statistics for the call to be tracked. The date and time field 306 indicates a date and time at which each respective call is connected, and the location field 308 indicates a location at which the call is placed. In at least one implementation, the location field 308 indicates a location of the client device 104 when a respective call was made via the client device 104 and using the geographic number 112.

In this particular example, all of the calls identified in the call data 302 took place in Tokyo. Thus, in an example where the geographic number 112 is a Tokyo phone number, the call data 302 indicates that the calls from the call set 204 are permitted calls. Consider, for instance, that a regulatory policy 134 and/or a call policy 122 identifies the geographic number 112 as a Tokyo phone number, such as based on an area code of the geographic number 112. Accordingly, calls within Tokyo using the geographic number 112 are classified as permitted calls.

Figure 4:
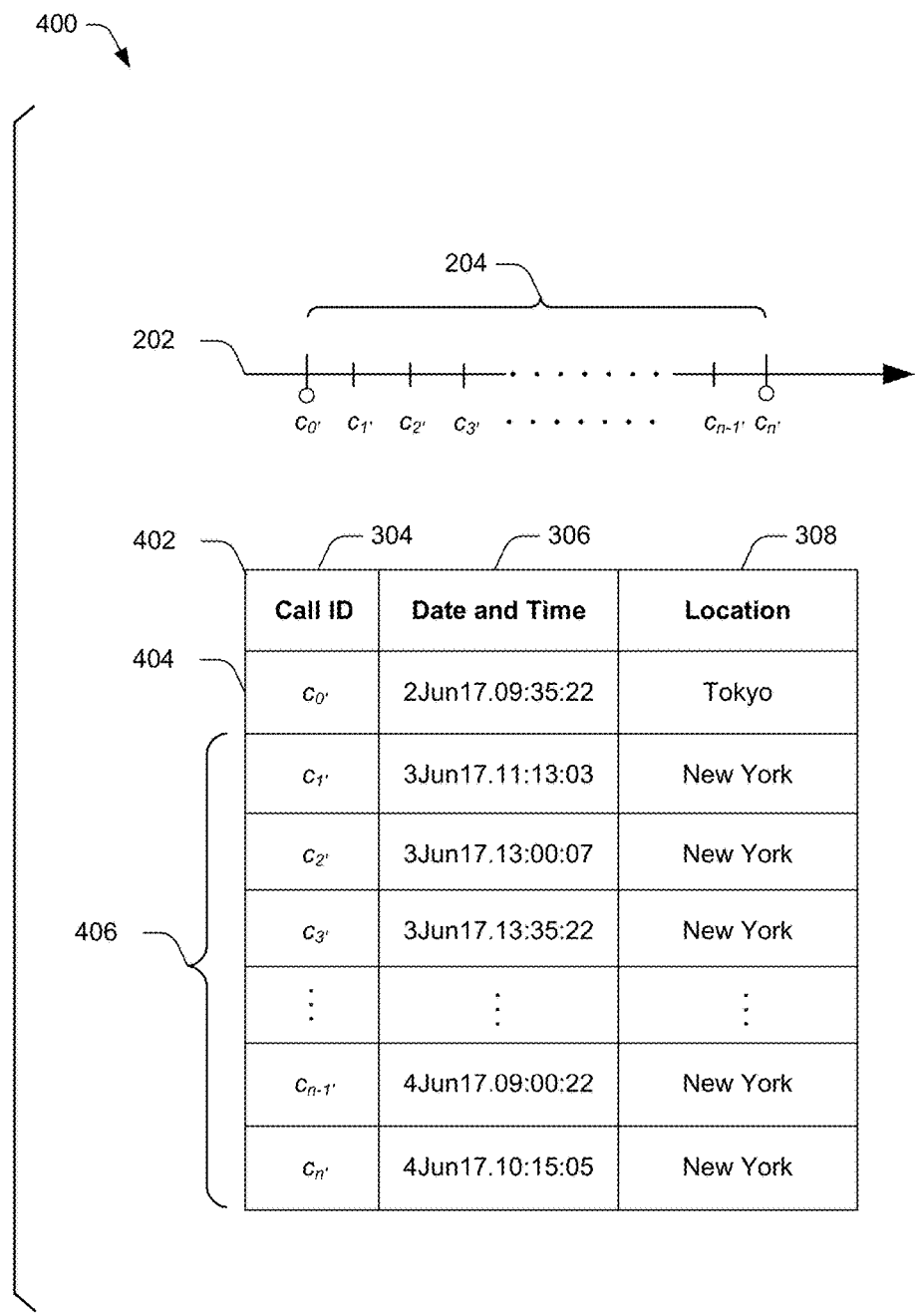
FIG. 4 depicts an example implementation scenario for tracking usage of a geographic number in accordance with one or more implementations.

FIG. 4 depicts an example implementation scenario 400 for tracking usage of a geographic number in accordance with one or more implementations. The scenario 400, for instance, represents another example implementation of the call set 204 introduced above and includes call data 402 from the usage statistics 128 and that describes various attributes of individual calls of the call set 204.

Consider for purposes of this example that the geographic number 112 is a Tokyo number, such as described above.

The call data 402 indicates that a call 404 occurred in Tokyo, and this represents a permitted call. Other calls 406 identified in the call data 402, however, were placed from New York, which is outside of the permissible calling area for the geographic phone number. Accordingly, the calls 406 are determined to be unpermitted calls, e.g., calls that are made in violation of the call policies 122. Generally, the calls 406 are unpermitted since they are made from an unpermitted location, e.g., outside of the designated geographic region for the geographic number 112. In at least one implementation, the calls 406 may be placed by a legitimate user of the geographic number 112 (e.g., a user associated with the user profile 110), but are considered unpermitted since they were placed from an unpermitted location. As described below, a preventative action can be performed to attempt to prevent further unpermitted calls from being placed using the geographic number 112. Examples of preventative actions are described below.

Figure 5:
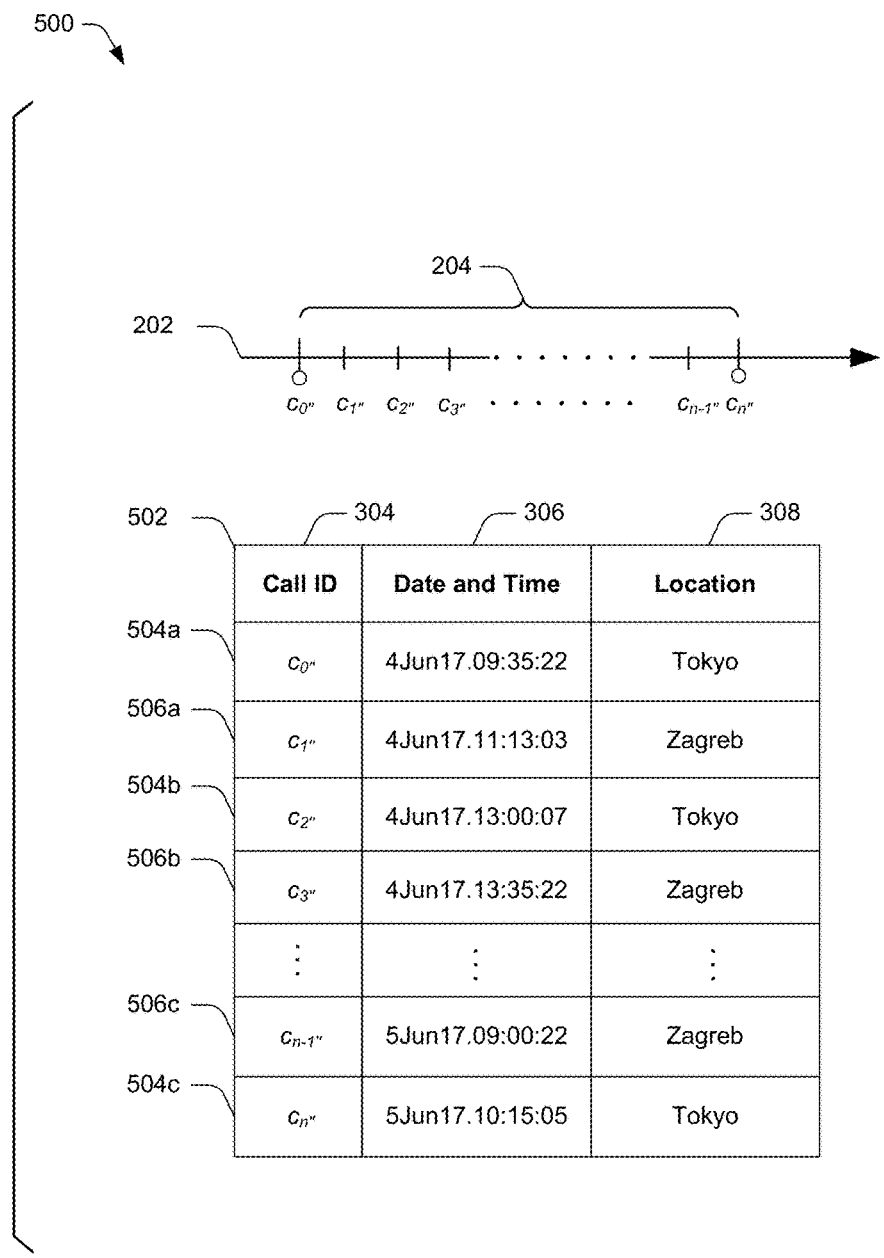
FIG. 5 depicts an example implementation scenario for tracking usage of a geographic number in accordance with one or more implementations.

FIG. 5 depicts an example implementation scenario 500 for tracking usage of a geographic number in accordance with one or more implementations. The scenario 500, for instance, represents another example implementation of the call set 204 introduced above and includes call data 502 from the usage statistics 128 that describes various attributes of individual calls of the call set 204.

Similarly to the previous example, consider that the geographic number 112 is a Tokyo phone number. Accordingly, the call data 502 indicates several permitted calls 504a, 504b, 504c are placed within Tokyo, and several unpermitted calls 506a, 506b, 506c that are placed outside of Tokyo, i.e., in Zagreb. Further, the unpermitted calls 506a-506c are placed at a location that is a considerable distance from Tokyo but were placed in close temporal proximity to the permitted calls 504a-504c. In at least some implementations, this disparity between location and temporal proximity may indicate use of the geographic number 112 by an unauthorized party. For instance, an unauthorized party may fraudulently obtain credentials for the user profile 110, and thus may make fraudulent calls using the geographic phone number. As further described below, a preventative action can be implemented to attempt to prevent further fraudulent use of the geographic number 112.

Figure 6:
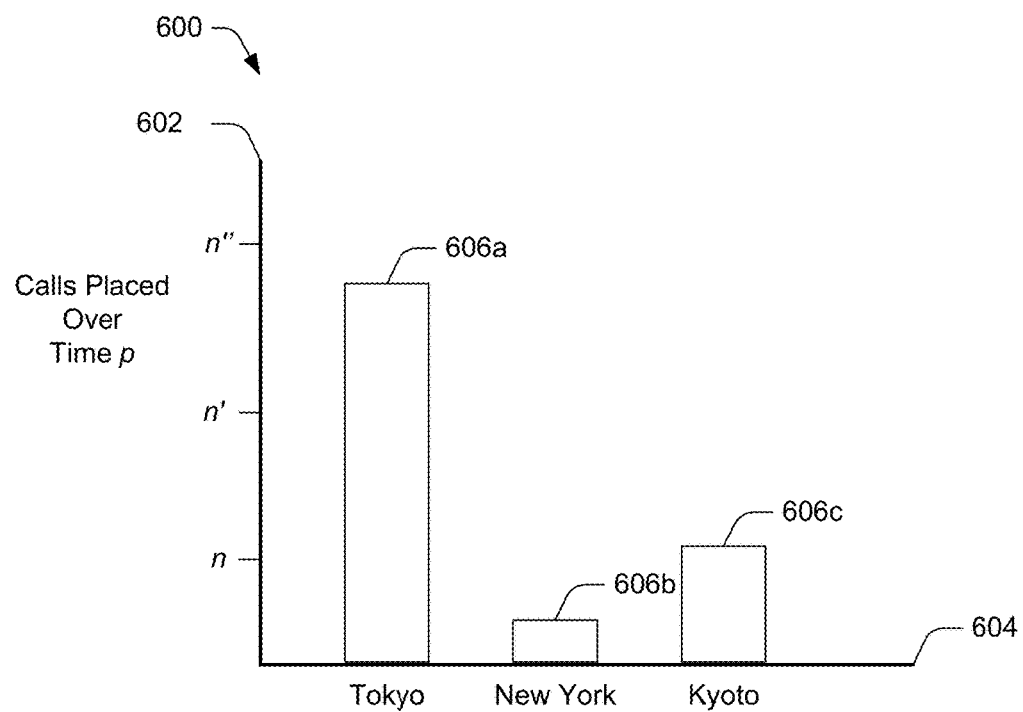
FIG. 6 depicts an example call chart which characterizes a call set of calls made with a geographic number in accordance with one or more implementations.

FIG. 6 depicts an example call chart 600 which characterizes the call set 204 based on where individual calls were placed. The call chart 600 generally represents a histogram representation of a distribution of calls using the geographic number 112 over different locations and over a discrete period of time, such as from the usage statistics 128. For instance, a y axis 602 represents a number of calls placed using the geographic number 112 over a time period p. An x axis 604 includes different locations and bins 606a, 606b, 606c that indicates a number of calls placed at the different locations.

Generally, the call chart 600 can be used as a statistical analysis tool to determine where calls are being made using the geographic number 112, and whether call usage of the geographic number 112 violates a call policy 122. In this particular example, the call chart 600 indicates that a majority of calls made over p were made in Tokyo. However, other calls were made in New York and Kyoto. In an example where the geographic number 112 is a Tokyo phone number, the calls in New York and Kyoto may violate a geographical use condition for the geographic number 112 as specified by a call policy 122.

In at least one implementation, a call threshold can be defined that represents a certain number and/or percentage of unpermitted calls over a particular time period, e.g., one month. If a number of unpermitted calls remains below the call threshold, no action may be taken. However, if a number of unpermitted calls exceeds the call threshold, a preventative action may be taken, examples of which are described below.

Having discussed some example implementation scenarios, consider now a discussion of some example procedures in accordance with one or more implementations.

The following discussion describes some example procedures for use condition for a geographic phone number in accordance with one or more implementations. The example procedures may be employed in the environment 100 of FIG. 1, the system 1000 of FIG. 10, and/or any other suitable environment. The procedures, for instance, represent example ways of performing various aspects of the scenarios described above. In at least some implementations, the steps described for the various procedures can be implemented automatically and independent of user interaction. Further, various steps of the procedures may be performed at the client device 104, at the communication service 108, at the number manager 120, and/or via interaction between these entities.

Figure 7:
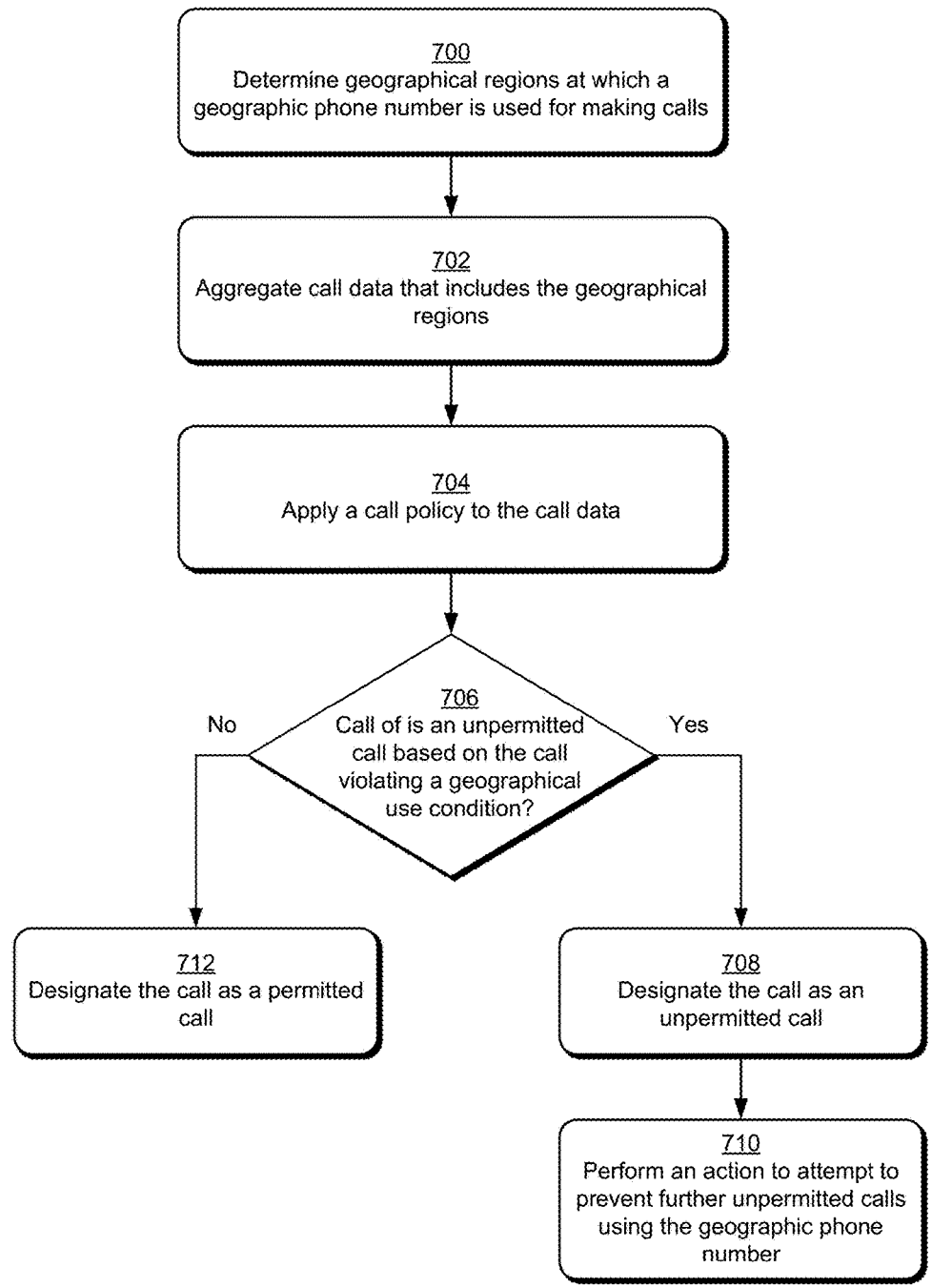
FIG. 7 is a flow diagram that describes steps in a method for determining whether a call violates a geographical use condition for a geographic phone number in accordance with one or more implementations.

FIG. 7 is a flow diagram that describes steps in a method in accordance with one or more implementations. The method, for instance, describes an example way of determining whether a call violates a geographical use condition for a geographic phone number.

Step 700 determines geographical regions at which a geographic phone number is used for making calls. Geographic regions for calls can be determined in various ways, such as querying the client device 104 for its location when calls are made, querying the communication service 108 for a location of the client device 104 when calls are made, and so forth. In at least one implementation, a location for a call can be determined by querying the communication client 106 for a location of the client device 104 at a time when a call is made.

Step 702 aggregates call data that includes the geographical regions. The number manager 120, for instance, aggregates call data from a specified period of time, and sorts each call based on which geographical location the call was made from. In at least one implementation, each geographical location is characterized based on a number of calls that were placed using the geographic phone number at the geographical location.

Step 704 applies a call policy to the call data. A call policy 122, for instance, is evaluated using the call data. In at least one implementation, the call policy includes a geographical use condition, such as a geographical region in which the geographic phone number is permitted to be used for a call, and/or a threshold number of calls that are permitted to be placed outside of the geographical region using the geographic phone number. As mentioned above, a call policy 122 can be generated based on a regulatory policy 134 that places a usage constraint on a geographic phone number.

Step 706 determines whether a call of the set of calls is an unpermitted call based on whether the call violates a geographical use condition specified by the call policy for the geographic phone number. For instance, if the call is placed outside of a permitted geographical region for the geographic phone number and/or exceeds a threshold number of calls outside of the permitted geographical region, the call is determined to violate the geographical use condition.

If the call violates the geographical use condition ("Yes"), step 708 designates the call as an unpermitted call. Step 710 performs an action to attempt to prevent further unpermitted calls using the geographic phone number. Examples of such actions are described below.

If the call does not violate the geographical use condition ("No"), step 712 designates the call as a permitted call. In at least one implementation, the process returns to step 700 and aggregates additional call data from other calls made using the geographic phone number.

Figure 8:
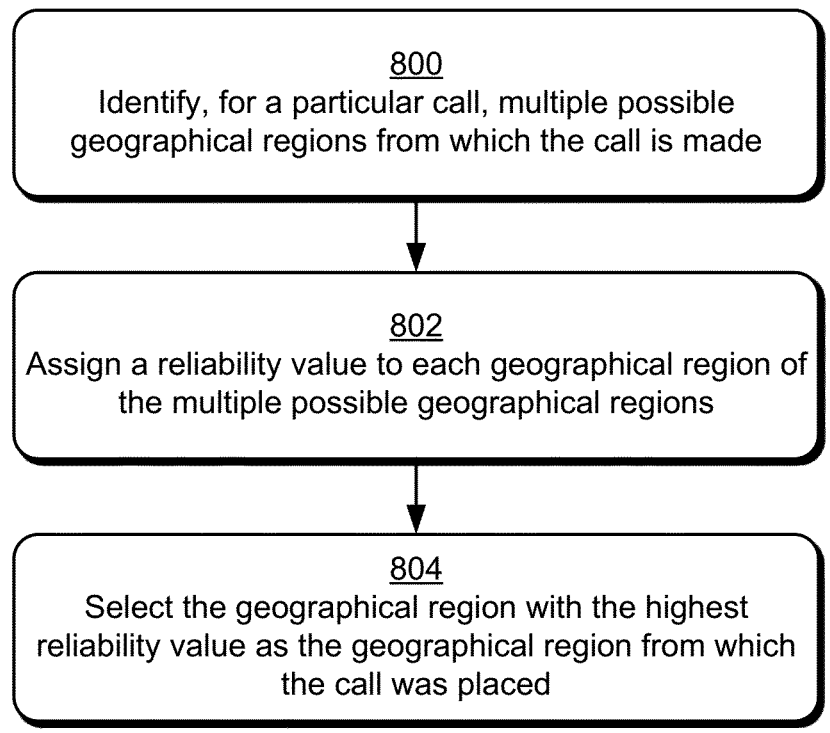
FIG. 8 is a flow diagram that describes steps in a method for selecting a geographical region as a region at which a call is placed in accordance with one or more implementations.

FIG. 8 is a flow diagram that describes steps in a method in accordance with one or more implementations. The method, for instance, describes an example way of selecting a geographical region as a region at which a call is placed.

Step 800 identifies, for a particular call, multiple possible geographical regions from which the call is made. For instance, multiple different location determination methods can be used to determine a geographical region at which a call is made, and each location determination method can return a different possible geographical region. In at least one implementation, the multiple different geographical regions correspond to different possible locations of the client device 104 when the call was made using the client device 104.

Step 802 assigns a reliability value to each geographical region of the multiple possible geographical regions. When multiple different location determination methods are used to determine a geographical region, for example, each location determination method can be associated with a different reliability value based on known past reliability of the method for providing a correct geographic location. Thus, each geographical region identified based on each respective location determination method is assigned the particular method's reliability value.

Step 804 selects the geographical region with the highest reliability value as the geographical region from which the call was placed. For instance, a geographic region identified using a location determination method with a highest reliability value is specified as the geographic region from which the call was placed. Thus, the call can be categorized and processed as originating from the geographical region, such as to determine whether the call was placed in violation of a call policy 122.

Figure 9:
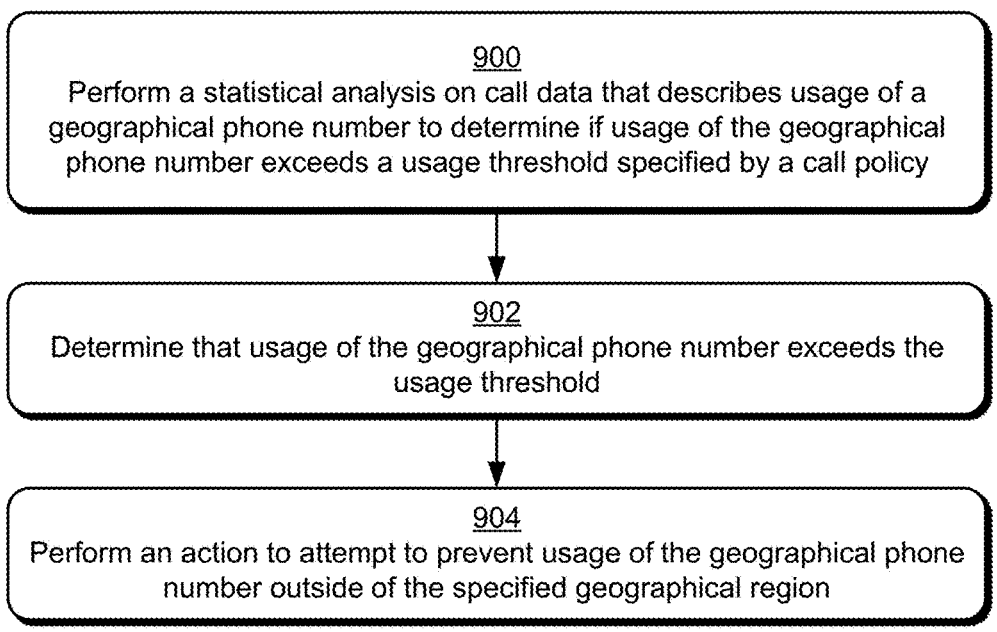
FIG. 9 is a flow diagram that describes steps in a method for performing an action to attempt to prevent usage of a geographic phone number outside of a specified geographical region accordance with one or more implementations.

FIG. 9 is a flow diagram that describes steps in a method in accordance with one or more implementations. The method, for instance, describes an example way of performing an action to attempt to prevent usage of a geographic phone number outside of a specified geographical region.

Step 900 performs a statistical analysis on call data that describes usage of a geographic phone number to determine if usage of the geographic phone number exceeds a usage threshold specified by a call policy. The usage threshold, for instance, pertains to usage of the geographic phone number outside of a specified geographical region. In at least one implementation, the usage threshold specifies a threshold number of calls that are permitted to be placed outside of the specified geographical region. Further, the usage threshold may be associated with a particular duration of time, such as one week, one month, and so forth.

In at least one implementation, the statistical analysis involves identifying different geographical regions at which different calls of a set of calls are placed using the geographic phone number, and categorizing each call based on which geographical region of the different geographical regions the call was placed at.

Step 902 determines that usage of the geographic phone number exceeds the usage threshold. The number manager 120, for instance, determines that a number of calls placed outside of the specified geographical region for the geographic phone number exceeds the threshold number of calls, such as a threshold number of calls over a discrete duration of time.

Step 904 performs an action to attempt to prevent usage of the geographic phone number outside of the specified geographical region. A variety of different actions can be performed to attempt to prevent unpermitted calls using a geographic phone number, such as calls that violate a geographical use condition of the number. Examples of such actions include:

General Call Blocking—

In at least one implementation, use of a geographic phone number can be strictly blocked without consideration of where a call is attempting to be made. The geographic phone number, for instance, can be blocked across many different locations, such as within a designated geographical region for the number, and outside of the designated geographical region.

Location-Selective Call Blocking—

In at least one implementation, use of a geographic phone number can be permitted within a geographical region designated for the number, but blocked outside of the geographical region. Generally, this may allow a user to use the number within a permitted geographical region, but not outside the region.

Violation Notification—

In at least one implementation, a user-detectable notification is generated that indicates that a geographical use condition is violated. The number manager 120, for instance, transmits a notification to the client device 104. The notification can be output by the client device 104, such as via a visual, audible, and/or tactile notification. For example, the notification can be output in a graphical user interface (GUI) of the communication client 106.

Proxy Calling—

In at least one implementation, the geographic phone number can be blocked for call usage. However, when a request to make a call using the geographic phone number request is detected at a geographic region designated for the geographic phone number, the call can be connected using an alternate phone number. The communication service 108, for instance, can detect a request to use the geographic number 112 at a geographic region designated for the number, and can cause the call to be connected using an alternate number 130 instead of the geographic number 112. In such a scenario, a caller ID detected at a called device can indicate the geographic number 112, even though the call is connected using the alternate number 130.

According to one or more implementations, proxy calling can be used in conjunction with a user notification. For example, when a violation of a geographic use condition for a geographic phone number is detected, the number manager can cause a notification to be presented on the client device indicating that the geographic number 112 is blocked but that the alternate number 130 is available for completing a call. Thus, a user may provide input (e.g., to the user notification) to cause a call to be placed using the alternate number 130.

User Authentication—

In at least one implementation, a user authentication procedure can be implemented. For instance, if a violation of a geographical use constraint for the geographic number 112 is detected, the number manager 120 can request user credentials, such as username and password. If the correct credentials are not provided, the geographic number 112 can be blocked, such as via general call blocking or location-selective call blocking. If the correct credentials are provided, however, the geographic number 112 may remain active, e.g., not blocked.

Accordingly, techniques for use condition for a geographic phone number described herein enable call policy for geographic phone numbers to be enforced, such as to maintain compliance with regulatory policy and service policy.

Having discussed some example procedures, consider now a discussion of an example system and device in accordance with one or more implementations.

Figure 10:
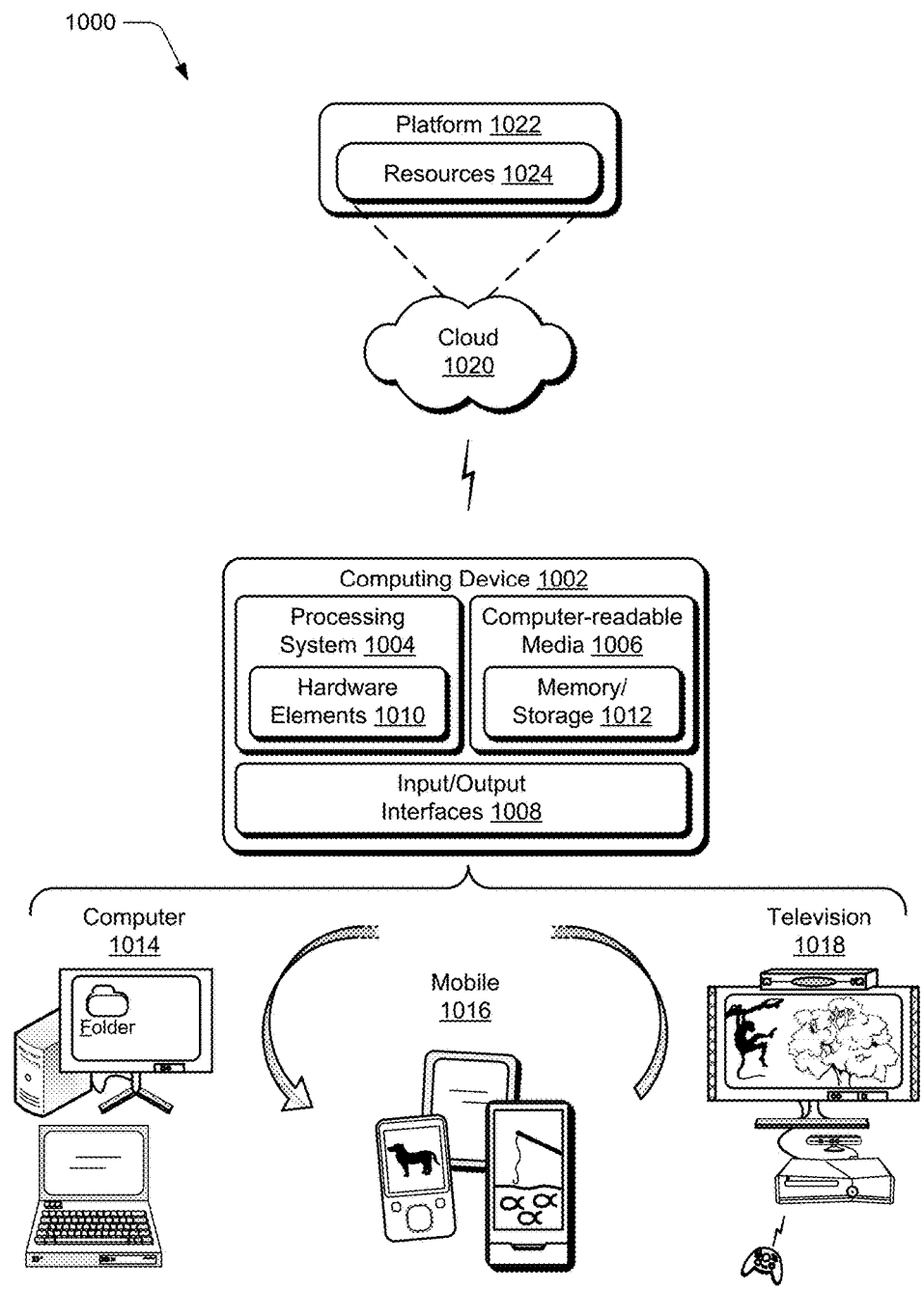
FIG. 10 illustrates an example system and computing device as described with reference to FIG. 1, which are configured to implement implementations of techniques described herein.

FIG. 10 illustrates an example system generally at 1000 that includes an example computing device 1002 that is representative of one or more computing systems and/or devices that may implement various techniques described herein. For example, the client device 104, the communication service 108, and/or the number manager 120 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client device 104, the communication service 108, and/or the number manager 120 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device implementation, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for performing an action to attempt to prevent unpermitted calls using a geographic phone number, the system including: at least one processor; and one or more computer-readable storage media including instructions stored thereon that, responsive to execution by the at least one processor, cause the system perform operations including: applying a call policy to call data that includes information about a set of calls made using a geographic phone number; determining that a call of the set of calls is an unpermitted call based on the call violating a geographical use condition specified by the call policy for the geographic phone number; and performing an action to attempt to prevent further unpermitted calls using the geographic phone number.

In addition to any of the above described systems, any one or combination of: wherein operations further include generating the call data to include a geographical region at which the call is placed, and wherein said determining includes determining that the geographical region at which the call is placed is outside of a geographical region specified in the call policy for the geographic phone number; wherein the geographic use condition restricts usage of the geographic phone number to a particular geographical region; wherein the geographical use condition is based on a regulatory policy that restricts usage of the geographic phone number to a particular geographical region; wherein the geographical use condition includes a threshold number of calls that are permitted to be placed using the geographic phone number outside of a particular geographical region; wherein the action includes blocking the geographic phone number for call usage; wherein the action includes generating a user-detectable notification indicating that the geographical use condition is violated; wherein the action includes: blocking the geographic phone number for call usage outside of a geographical region specified by the call policy; and allowing the geographic phone number to be used for call usage within the geographical region; wherein the geographical use condition restricts usage of the geographic phone number to a particular geographical region, and wherein the action includes: blocking the geographic phone number for call usage; detecting a request to make a call using the geographic phone number at the particular geographic region; and causing the call to be connected using an alternate phone number; wherein the geographical use condition restricts usage of the geographic phone number to a particular geographical region, said determining includes determining that the call is made at a different geographical region, and wherein the action includes generating a notification configured to enable an alternate phone number to be used for making a call at the different geographical region.

A computer-implemented method for performing an action to attempt to prevent unpermitted calls using a geographic phone number, the method including: performing a statistical analysis on call data that describes usage of a geographic phone number to determine if usage of the geographic phone number exceeds a usage threshold specified by a call policy, the usage threshold pertaining to usage of the geographic phone number outside of a specified geographical region; determining that usage of the geographic phone number exceeds the usage threshold; and performing an action to attempt to prevent usage of the geographic phone number outside of the specified geographical region.

In addition to any of the above described methods, any one or combination of: wherein the usage threshold specifies a threshold number of calls placed outside of the specified geographical region over a discrete period of time; wherein the statistical analysis includes: identifying different geographical regions at which different calls of a set of calls are placed using the geographic phone number; and categorizing each call based on which geographical region of the different geographical regions the call was placed at, wherein the usage threshold specifies a threshold number of calls placed outside of the specified geographical region; wherein the action includes one or more of: blocking the geographic phone number for call usage within the specified geographical region and outside of the specified geographical region; or blocking the geographic phone number for call usage outside of the specified geographical region and allowing the geographic phone number to be used for call usage within the geographical region A computer-implemented method for determining whether a call is an unpermitted call based on whether the call violates a geographical use condition, the method including: determining geographical regions at which a geographic phone number is used for making calls; aggregating call data that includes the geographical regions; applying a call policy to the call data; and determining whether a call of the set of calls is an unpermitted call based on whether the call violates a geographical use condition specified by the call policy for the geographic phone number.

In addition to any of the above described methods, any one or combination of: wherein said determining the geographical regions includes querying a communication client on a device from which the calls are made for a location of the device; wherein said determining the geographical regions includes: identifying, for a particular call, multiple possible geographical regions from which the call is made; assigning a reliability value to each geographical region of the multiple possible geographical regions; and selecting the geographical region with the highest reliability value as the geographical region from which the call was placed; wherein the geographical use condition includes a threshold number of calls outside of a particular geographical region; wherein said determining includes determining that the call is an unpermitted call based on the call violating a geographical use condition specified by the call policy for the geographic phone number; wherein said determining includes determining that the call is an unpermitted call based on the call violating a geographical use condition specified by the call policy for the geographic phone number, and wherein the method further includes performing an action to attempt to prevent further violation of the geographical use condition.

Techniques for use condition for a geographic phone number are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:
1. A system comprising:
at least one hardware processor; and
one or more computer-readable storage media including instructions stored thereon that, responsive to execution by the at least one hardware processor, cause the system perform operations including:

applying a call policy to call data that includes information about a set of calls originating from a geographic phone number;

determining that a call of the set of calls is an unpermitted call based on the call violating a geographical use condition specified by the call policy for the originating geographic phone number, the geographical use condition restricting usage of the originating geographic phone number to a particular geographical region;

detecting a request to make a call originating from the geographic phone number;

generating a notification that enables an alternate phone number to be used for originating the call based on the determining of the unpermitted call; and causing, based on a selection of the notification, the call to be connected using the alternate phone number as a second originating phone number.

2. A system as recited in claim 1, wherein operations further include generating the call data to include a geographical region at which the call is placed, and wherein said determining comprises determining that the geographical region at which the call is placed is outside of the geographical region specified in the call policy for the geographic phone number.

3. A system as recited in claim 1, wherein the geographical use condition is based on a regulatory policy that restricts usage of the geographic phone number to the particular geographical region.

4. A system as recited in claim 1, wherein the geographical use condition comprises a threshold number of calls that are permitted to be placed using the geographic phone number outside of the particular geographical region.

5. A system as recited in claim 1, wherein the operations further include generating a user-detectable notification indicating that the geographical use condition is violated.

6. A system as recited in claim 1, wherein the operations further include:
allowing the geographic phone number to be used for call usage within the particular geographical region.

7. A system as recited in claim 1, wherein said determining comprises determining that the call is made at a different geographical region.

8. A system as recited in claim 1, the operations further comprising blocking the geographic phone number for usage outside of the geographical region, and allowing the geographic phone number to be used within the geographical region.

9. A system as recited in claim 1, wherein said causing the call to be connected is performed by a communication client.

10. A system as recited in claim 1, wherein the operations further include presenting a notification that the geographic phone number is blocked.

11. A computer-implemented method, comprising:
performing a statistical analysis on call data that describes usage of a geographic phone number for originating calls to determine if usage of the geographic phone number for originating calls exceeds a usage threshold specified by a call policy, the usage threshold pertaining to usage of the geographic phone number for originating calls outside of a specified geographical region;
determining that usage of the geographic phone number for originating calls exceeds the usage threshold;
generating a notification to enable an alternate phone number to be used for originating a call at a different geographical region based on the usage exceeding the threshold; and
causing the call to be connected based on receiving an indication of a selection of the notification.

12. A method as described in claim 11, wherein the usage threshold specifies a threshold number of calls placed outside of the specified geographical region over a discrete period of time.

13. A method as described in claim 11, wherein the statistical analysis comprises:
identifying different geographical regions at which different calls of a set of calls are placed using the geographic phone number; and
categorizing each call based on from which geographical region of the different geographical regions the call was placed,
wherein the usage threshold specifies a threshold number of calls placed outside of the specified geographical region.

14. A method as described in claim 11, further comprising:
blocking the geographic phone number for call usage within the specified geographical region and outside of the specified geographical region; or
blocking the geographic phone number for call usage outside of the specified geographical region and allowing the geographic phone number to be used for call usage within the geographical region.

15. A method as recited in claim 11, further comprising presenting a notification that the geographic phone number is blocked outside of the specified geographical region.

16. A computer-implemented method, comprising:
determining geographical regions at which a geographic phone number was used as a phone number for originating calls;
aggregating call data that includes the determined geographical regions;
determining that a call of the originated calls is an unpermitted call based on determining that the call violates a geographical use condition for the originating geographic phone number;
detecting a request to make a call originating from the geographic phone number;
generating, a notification that enables an alternate phone number to be used for originating a call based on the determining of the unpermitted call; and
causing the call to be connected using the alternate phone number as a second originating phone number.

17. A method as described in claim 16, wherein said determining of the geographical regions comprises querying a communication client on a device from which the calls are made for a location of the device.

18. A method as described in claim 16, wherein said determining of the geographical regions comprises:
identifying, for a particular call, multiple possible geographical regions from which the call is made;
assigning a reliability value to each geographical region of the multiple possible geographical regions; and
selecting the geographical region with the highest reliability value as the geographical region from which the call was placed.

19. A method as described in claim 16, wherein the geographical use condition comprises a threshold number of calls outside of a particular geographical region.

20. A method as recited in claim 16, further comprising presenting a notification that the geographic phone number is blocked based on the call violating the geographical use condition.

* * * * *